(12) United States Patent
Tani (10) Patent No.: US 6,243,344 B1
(45) Date of Patent: Jun. 5, 2001

(54) OPTICAL STORAGE DEVICE HAVING A SECTOR MARK DETECTING CIRCUIT

(75) Inventor: Hiroshi Tani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/106,529

(22) Filed: Jun. 29, 1998

(30) Foreign Application Priority Data

Jan. 29, 1998  (JP) .................................................. 10-017010

(51) Int. Cl.$^7$ ...................................................... G11B 7/00
(52) U.S. Cl. .................................. 369/59.17; 369/47.27; 369/47.25; 369/47.35
(58) Field of Search ................................. 369/48, 47, 59, 369/54, 58, 53

(56) References Cited

U.S. PATENT DOCUMENTS

| | | | |
|---|---|---|---|
| 5,347,505 | * 9/1994 | Moritsugu et al. ...................... | 369/59 |
| 5,532,991 | * 7/1996 | Sasaki .................................... | 369/50 |
| 5,566,077 | * 10/1996 | Kulakowski et al. .................. | 369/53 |
| 5,617,400 | 4/1997 | Fuji ....................................... | 369/116 |
| 5,642,343 | * 6/1997 | Toda et al. ............................. | 369/59 |
| 5,777,964 | * 7/1998 | Furuta et al. .......................... | 369/58 |
| 5,790,482 | * 8/1998 | Saga et al. ............................. | 369/58 |
| 5,808,989 | * 9/1998 | Ueki et al. ............................. | 369/58 |
| 5,848,037 | * 12/1998 | Iwasaki et al. ........................ | 369/47 |
| 5,848,040 | * 12/1998 | Tanaka ................................... | 369/47 |
| 5,864,531 | 1/1999 | Horigome ............................. | 369/124 |
| 5,872,754 | * 2/1999 | Taguchi et al. ........................ | 369/58 |
| 5,963,518 | * 10/1999 | Kobayashi et al. .................... | 369/58 |
| 5,978,322 | * 11/1999 | Sugimoto et al. ..................... | 369/58 |

FOREIGN PATENT DOCUMENTS 9723874   7/1997  (WO).

* cited by examiner

Primary Examiner—Nabil Hindi
(74) Attorney, Agent, or Firm—Greer, Burns & Crain, Ltd.

(57) ABSTRACT

A sector mark detecting circuit for detecting a sector mark on an optical storage medium includes a binarizing circuit which binarizes a reading signal of an optical head in accordance with a predetermined detection parameter and is capable of changing the detection parameter. A recognizing circuit is adapted to recognize a sector mark from an output of the binarizing circuit, and a control circuit is adapted to measure an optimal value of the detection parameter of the binarizing circuit and control the detection parameter of the binarizing circuit to the optimal value. A sector mark detection rate is thereby enhanced.

14 Claims, 13 Drawing Sheets

OPTICAL STORAGE DEVICE HAVING A SECTOR MARK DETECTING CIRCUIT

BACKGROUND OF THE INVENTION

1. Field of the Invention

The present invention relates to an optical storage device including a sector mark detecting circuit for detecting a sector mark on an optical storage medium.

2. Description of the Related Art

In an optical storage device such as an optical disk device etc, an optical storage medium is irradiated with a light beam from an optical head, thus reading and writing information. An increase in storage capacity has been demanded of this type of optical storage devices.

Figure 14A:
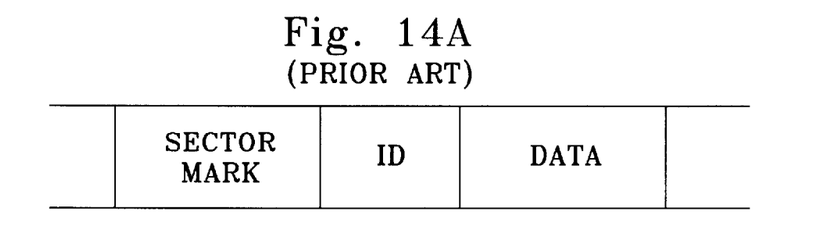
FIGS. 14A and 14B are explanatory diagram showing the prior art.
Figure 14B:
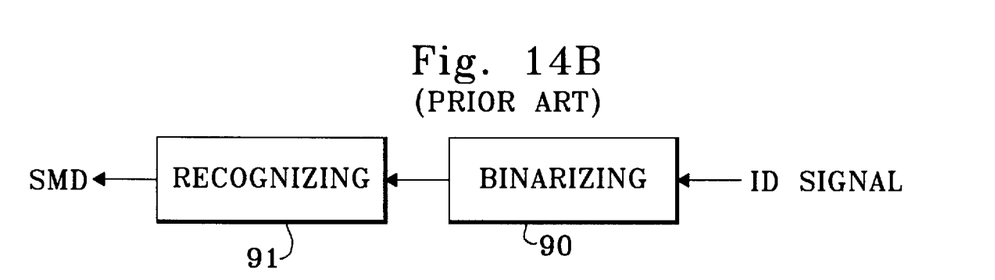

FIGS. 14A and 14B are explanatory diagrams showing the prior art.

Each track on an optical disk is segmented into sectors. As shown in FIG. 14A, a head of each sector is provided with a sector mark for recognizing the start of the sector. The sector mark is composed of an easily distinguishable pattern of data. Provided subsequent to the sector mark are an identifier (ID) region and a data region including DATA FIELD. The identifier region has at least a VFO adjusting pattern and an address mark (AM). User data is written to the DATA FIELD. A header is written as an embossed pit by a disk medium manufacturer, and the user is unable to rewrite the header.

An ID signal is set in connection with an existence and non-existence of the embossed pit previously formed in the disk medium, and is detected from a variation in light quantity of the light beams on a detector. In the magneto-optic disk, a magnetizing direction of a recording film on the disk medium is conceived as a change in polarizing plane of the laser beams, and an MO signal is detected on the detector. Further, according to the phase change type optical disk, recording is effected by utilizing a phase change phenomenon of the recording film, and a DD signal is detected as a variation in light beam of the laser beam.

The identifier (ID) region is recognized by detecting the sector mark, and there are confirmed addresses of a track number, an ID number and a sector number. Then, accessing of the data region is executed. It is therefore required that the sector mark be detected with high accuracy.

As illustrated in FIG. 14B, the sector mark detecting circuit is constructed of a binarizing circuit 90 for binarizing the reading signal, and a recognizing circuit 91 for recognizing the sector mark from the output of the binarizing circuit 90. This binarizing circuit 90 imparts a gain to the reading signal and compares it with a predetermined slice level. A binarized signal is thereby obtained.

Binarization detecting conditions such as the gain and the slice level have hitherto been fixedly set.

There arise, however, the following problems inherent in the prior art.

First, the conditions for the optical detection becomes more strict as the storage capacity of the optical disk gets larger. For example, a scatter in terms of performance of a laser diode or a photo detector exerts an influence on the sector mark detection rate. Therefore, according to the prior art by which the same detecting condition is set in each device, the sector mark detection rate decreases, and a decline of an access time is caused.

Second, the optical disk device needs to deal with portable optical disks having different storage capacities. For instance, a 3.5 in. optical disk is classified into a 128 MB disk, a 230 MB disk, a 540/640 MB disk and a 1.3 GB disk. In the conventional sector mark detecting circuit, the same detecting condition is set in the portable optical disks having the different storage capacities, and consequently the sector mark detection rate decreases as well as causing the decline of the access time. Namely, with an enhancement of the storage density, a data density/track density rises, and a noise quantity increases. The sector mark detection rate is thereby decreased. For example, the 128 MB optical disk has 25 sectors per track. The 540 MB optical disk, however, has 84 sectors per track, which is more than 3-fold strictness in terms of timing.

SUMMARY OF THE INVENTION

It is a primary object of the present invention to provide an optical storage device including a sector mark detecting circuit for enhancing a sector mark detection rate.

It is another object of the present invention to provide an optical storage device including a sector mark detecting circuit for enhancing the sector mark detection rate even when a storage capacity increases.

It is still another object of the present invention to provide an optical storage device including a sector mark detecting circuit for enhancing the sector mark detection rate even when dealing with a variety of optical storage mediums.

To accomplish the above objects, according to one aspect of the present invention, a sector mark detecting circuit in an optical storage device for reading information from an optical storage medium by use of an optical head, comprises a binarizing circuit for binarizing a reading signal of said optical head in accordance with a predetermined detection parameter, which circuit is capable of changing the detection parameter, a recognizing circuit for recognizing a sector mark from an output of the binarizing circuit, and a control circuit for measuring an optimal value of the detection parameter of the binarizing circuit, and controlling the detection parameter of the binarizing circuit to the optimal value.

According to the present invention, a sector mark detecting condition optimal to each optical storage device is automatically measured, thereby adjusting a detection parameter of the binarizing circuit to an optimal value. The binarizing circuit capable of making the detection parameter variable is therefore provided. Provided further is the control circuit for measuring the optimal value of the detection parameter of the binarizing circuit and controlling the detection parameter of the binarizing circuit to the optimal value.

According to the present invention, the sector mark detecting condition of each optical storage device can be set to the optimal value. Hence, it is possible to enhance a sector mark detection rate even when the storage capacity of the optical storage medium increases. Further, even when treating a variety of optical storage mediums, the sector mark detection rate can be enhanced. Accordingly, it is feasible to prevent a decline of an access time of the optical storage device.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given above, serve to explain the principle of the invention, in which.

DETAILED DESCRIPTION OF THE PREFERRED EMBODIMENTS

Figure 1:
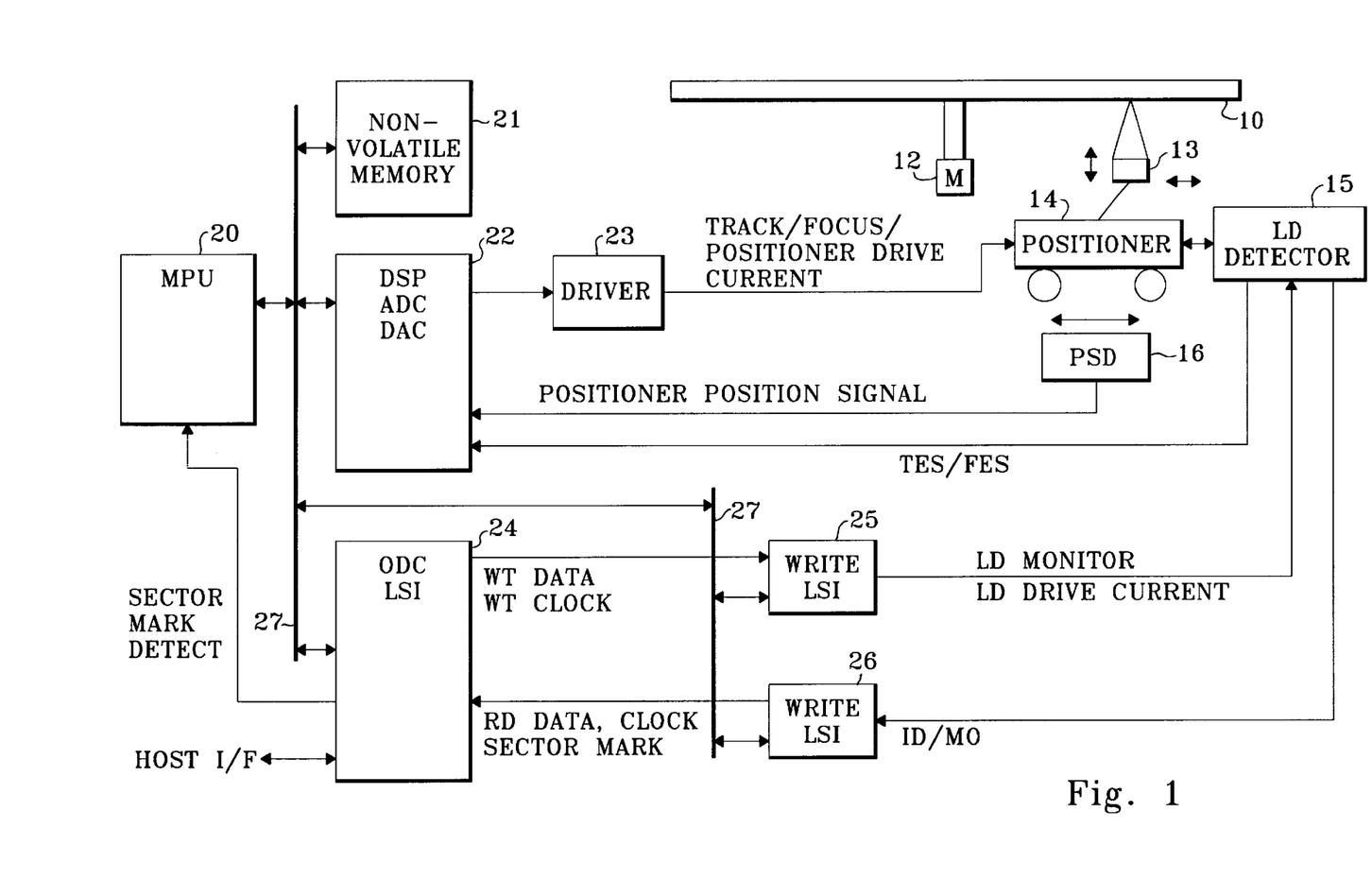
FIG. 1 is a diagram showing a construction of an optical disk device in one embodiment of the present invention.
Figure 2:
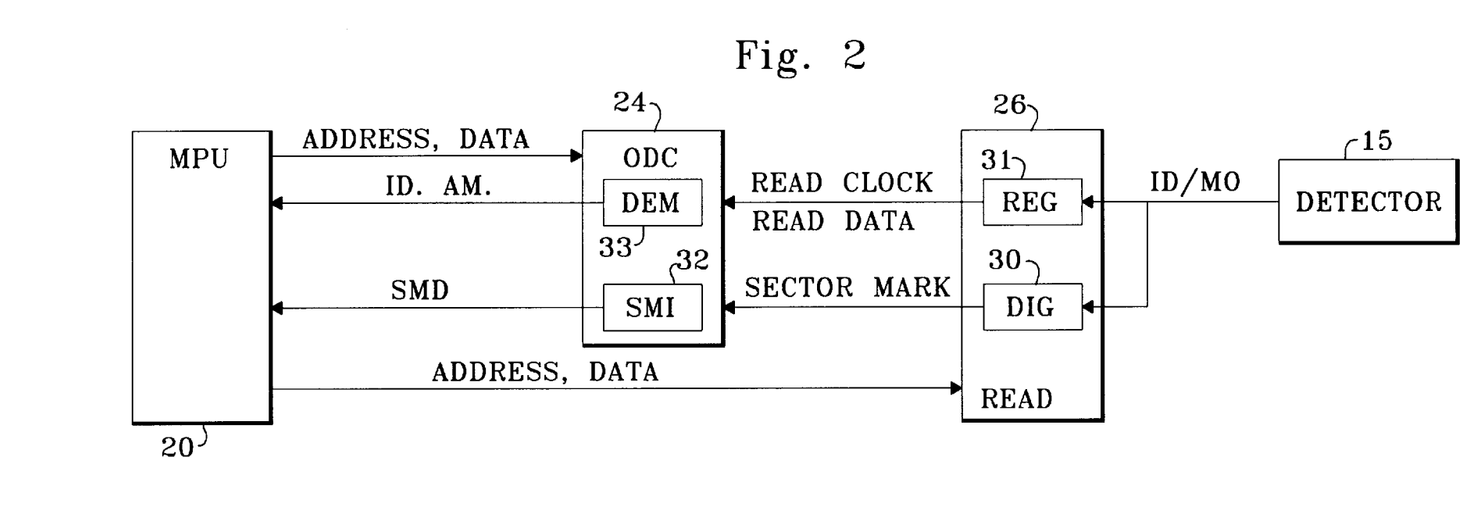
FIG. 2 is a diagram showing a construction of a read circuit in FIG. 1.

FIG. 1 is a diagram showing a construction of an optical disk device in one embodiment of the present invention. FIG. 2 is a diagram illustrating a construction of a read circuit in FIG. 1.

As illustrated in FIG. 1, an optical disk 10 is rotated by a spindle motor 12. An optical head 13 includes an objective lens, a focus actuator and a track actuator. The optical head 13 is mounted on a positioner 14. The positioner 14 positions the optical head 13. An optical fixing unit 15 has a laser diode and an optical detector.

The laser diode of the optical fixing unit 15, after light beams emitted therefrom have been incident upon the optical head 13 via the positioner 14, irradiates the optical disk 10 with the light beams through the optical head 13. The light beams reflected from the optical disk 10 are incident upon the optical head 13 and thereafter fall on the optical detector of the optical fixing unit 15 via the positioner 14.

A position detector 16 detects a position of the positioner 14 and outputs a position signal of the positioner. An MPU 20 controls the whole device and is constructed of a microprocessor. A non-volatile memory 21 is stored with a program and data required for processing by the MPU 20.

A DSP 22 performs focus control, track control and positioner control, and is constructed of a digital signal processor. The DSP 22 receives a track error signal TES from the optical detector of the optical fixing unit 15, a focus error signal FES and the positioner position signal from the position detector 16, and calculates a track drive signal, a focus drive signal and a positioner drive signal.

A driver circuit 23 converts the drive signals into drive currents, and outputs the drive currents to the track actuator and the focus actuator of the optical head 13 as well as to the positioner 14.

A disk control circuit (ODC) 24 performs interface control with a higher-order device. The ODC 24 outputs write data and a write clock, and receives read data, a read clock and a sector mark signal. A write circuit 25 receives a monitor signal of the laser beam from the optical fixing unit 15, and outputs drive current of the laser diode.

A read circuit 26 detects the read data, the read clock and the sector mark from the reading signals transmitted from the optical fixing unit 15. An address/data bus 27 is a bus through which the data and signals are transferred and received between the MPU 20, the memory 21, the DSP 22, the ODC 24, the write circuit 25 and the read circuit 26.

As shown in FIG. 2, the read circuit 26 includes a binarizing circuit 30 and a regenerating circuit 31. The binarizing circuit 30 binarizes the reading signal for detecting the sector mark. The regenerating circuit 31 regenerates the read data and the read clock from the reading signal (an MO signal in the case of the magneto-optic disk, and a DD signal in the case of a phase change type optical disk).

The ODC 24 includes a sector mark recognizing circuit 32 and a demodulating circuit 33. The sector mark recognizing circuit 32 recognizes the sector mark from the binarized signal transmitted from the binarizing circuit 30. Then, the sector mark recognizing circuit 32, when detecting the sector mark, outputs a sector mark detection signal SMD to the MPU 20.

The demodulating circuit 33 receives the read clock and the read data, and outputs the ID signal to the MPU 20. The MPU 20 controls the ODC 24 and the read circuit 26 through an address/data bus.

Figure 3:
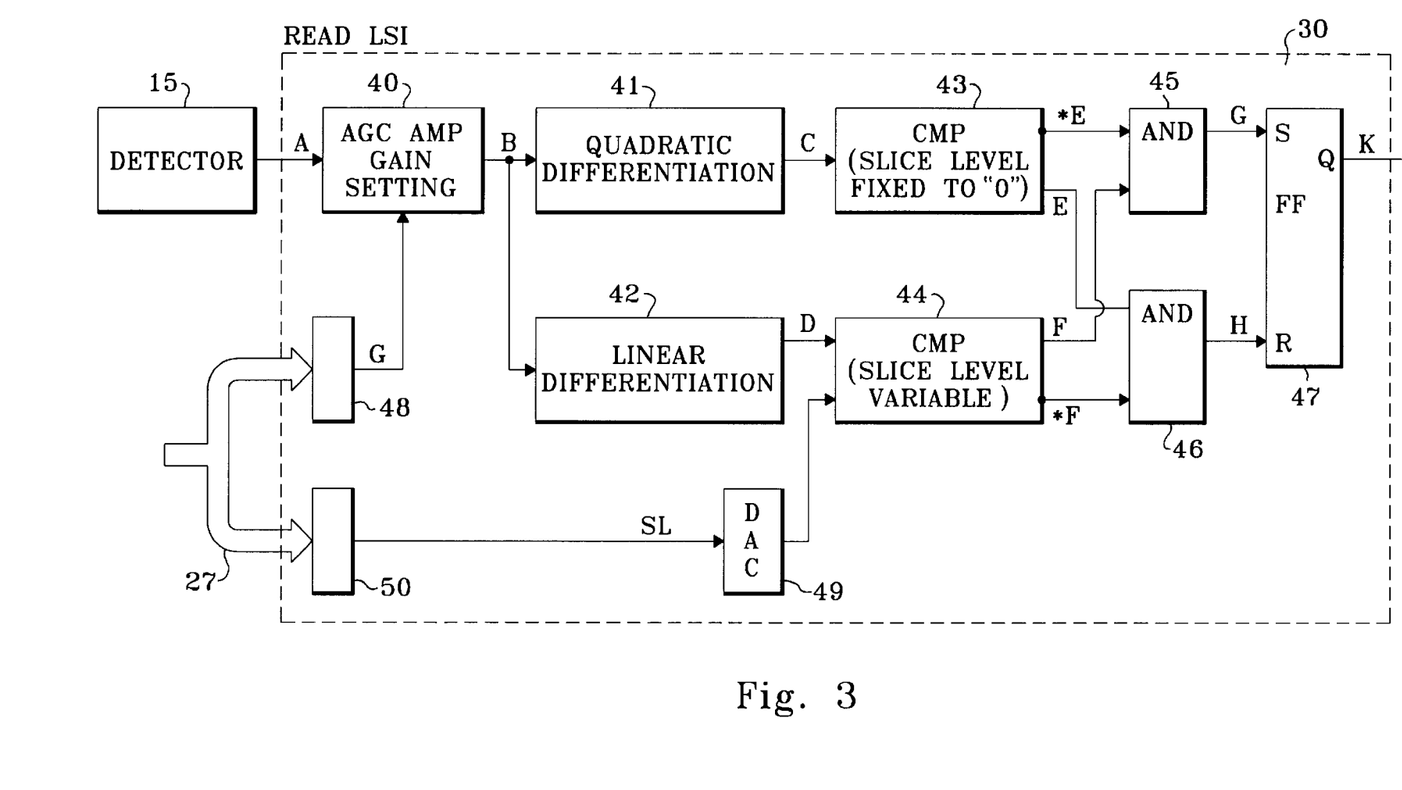
FIG. 3 is a block diagram of a binarizing circuit in FIG. 2.
Figure 4:
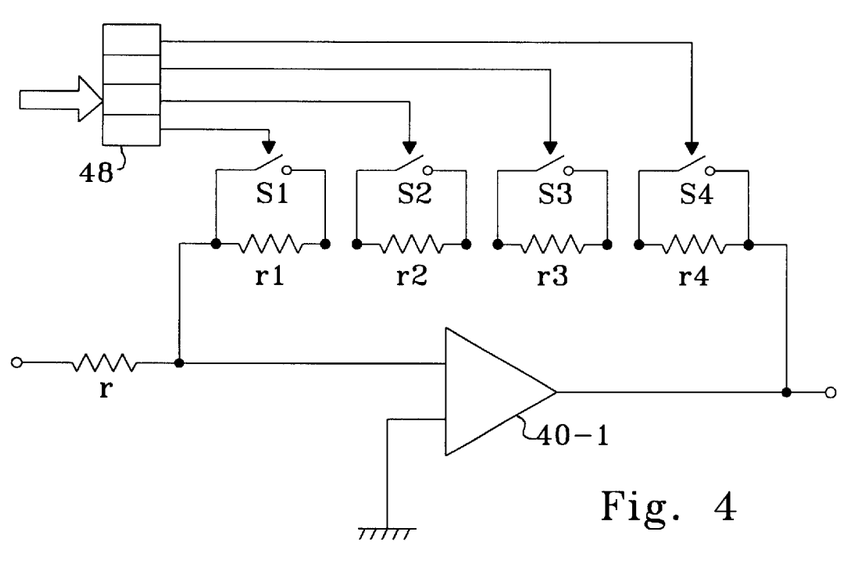
FIG. 4 is a diagram showing a construction of an AGC amplifier in FIG. 3.
Figure 5:
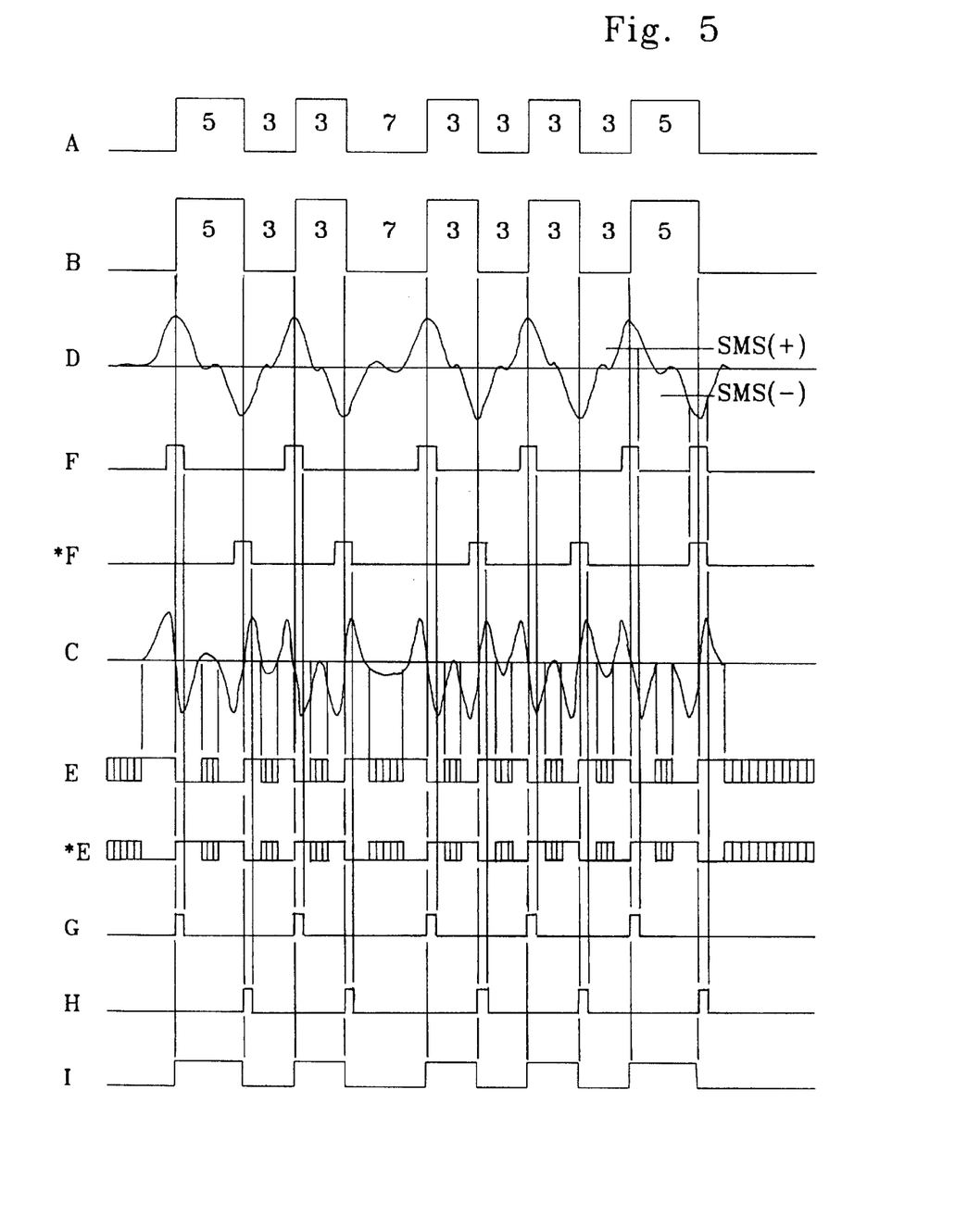
FIG. 5 is a diagram showing respective waveforms in the binarizing circuit in FIG. 3.

FIG. 3 is a block diagram showing the binarizing circuit 30 in FIG. 2. FIG. 4 is a diagram showing an construction of an AGC amplifier in FIG. 3. FIG. 5 is a diagram showing respective waveforms in the binarizing circuit in FIG. 3.

As shown in FIG. 3, an AGC amplifier 40 amplifies a reading signal A with a predetermined gain G. Herein, as shown in FIG. 5, a pattern of the sector mark recorded in the sector mark region is exemplified by a 53335 pattern. To be specific, in this pattern a high-level period continues such as 5T, 3T, 3T, 3T, 5T. A low-level period in this span continues such as 3T, 7T, 3T, 3T. Note that T indicates a 1-channel bit length.

A linear differentiating circuit 42 linearly differentiates an output B of the AGC amplifier 40. The following is a reason why the linear differentiation is implemented. A quantity of the reflected light beams largely fluctuates because of receiving influences of surface vibrations and fluctuations in reflectivity of the disk medium, and consequently a baseline fluctuates. The fluctuations in this baseline are prevented, and pulses are to be detected. Namely, the linear differentiating circuit 42 differentiates once the output B of the AGC amplifier 40, and then outputs a linear differentiation signal D. A comparator 44 compares the linear differentiation signal D with slice levels SMS(+) and SMS(−). The comparator 44 outputs a comparison signal F indicating a result of the comparison and an inversion signal *F thereof.

A quadratic differentiating circuit 41 quadratically differentiates the output B of the AGC amplifier 40. That is, the output of the AGC amplifier 40 has been differentiated, and thereafter the differentiation signal thereof is again differentiated in order to generate data corresponding the bit length. A comparator 43 compares a quadratic differentiation signal C with a zero level. The comparator 43 outputs a comparison signal E indicating a result of the comparison and an inversion signal *E thereof.

An AND gate 45 outputs a logic product G of the comparison signal F and the inversion signal *E. An AND gate 46 outputs a logic product H of the comparison signal E and the inversion signal *F. A flip-flop 47 is set by a logic product signal G and reset by a logic product signal H. Accordingly, a binarized sector mark signal K is obtained from the flip-flop 47.

A control gain G given by the MPU 20 through the bus 27 is set in a register 48. As shown in FIG. 4, the AGC amplifier 40 is constructed of an amplifier 40-1, an input resistance r, and feedback resistances r1, r2, r3, r4. The feedback resistances r1, r2, r3, r4 are connected in series.

Switches S1, S2, S3, S4 are connected in parallel to the feedback resistances r1, r2, r3, r4. The switches S1, S2, S3, S4 are adjusted by the control gain G of the register 48. Therefore, a gain of the AGC amplifier 40 is adjusted by the gain G set in the register 48.

A slice level SL given by the MPU 20 via the bus 27 is set in a register 50. A DAC (digital/analog converter) 49 converts the slice level SL of the register 50 into an analog quantity, and outputs the slice level of the comparator 44. Hence, the slice levels SMS (+) and (-) of the comparator 44 is adjusted by the slice level set in the register 50.

Figure 6:
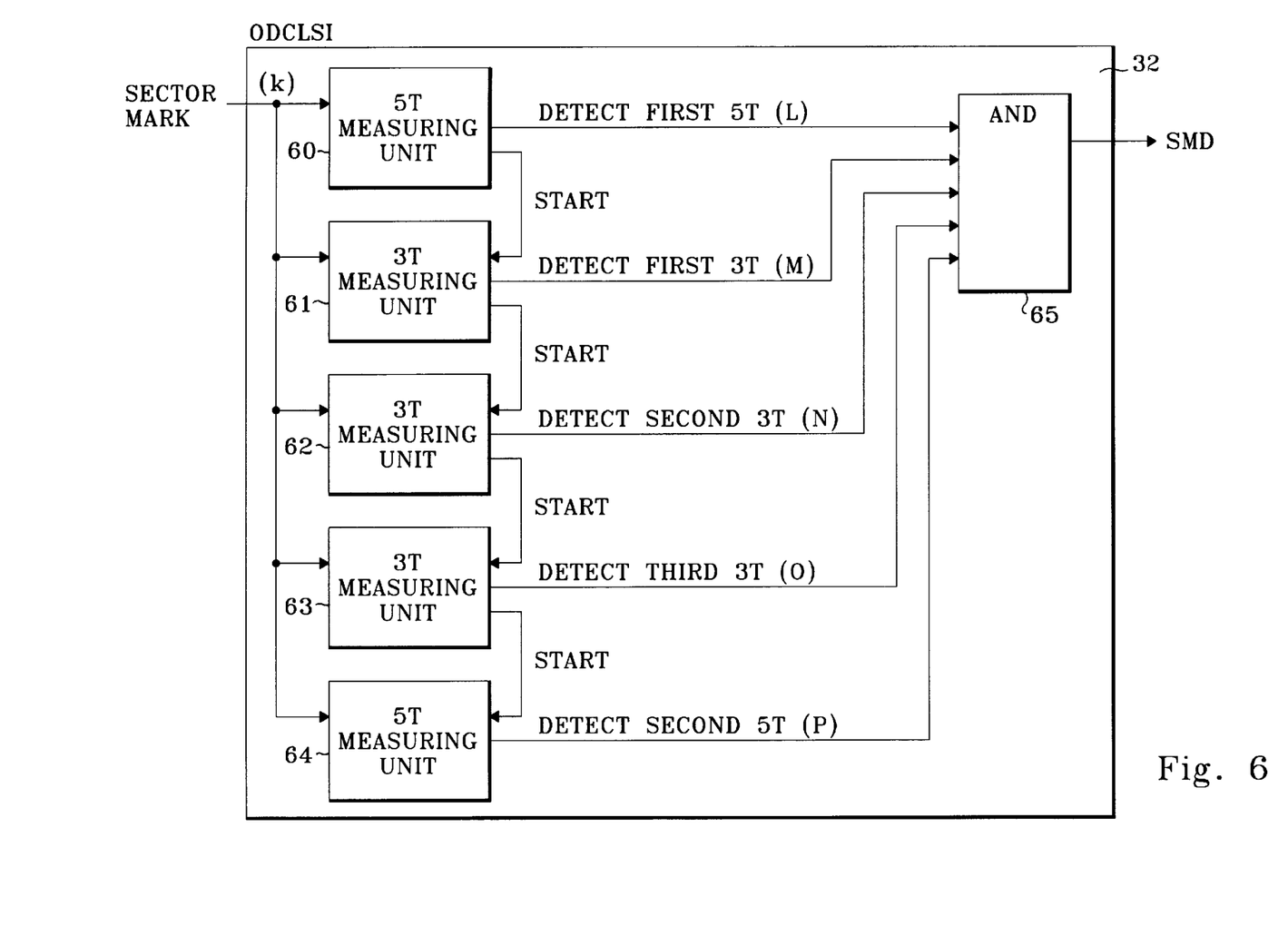
FIG. 6 is a diagram showing a construction of a sector mark recognizing circuit in FIG. 2.
Figure 7:
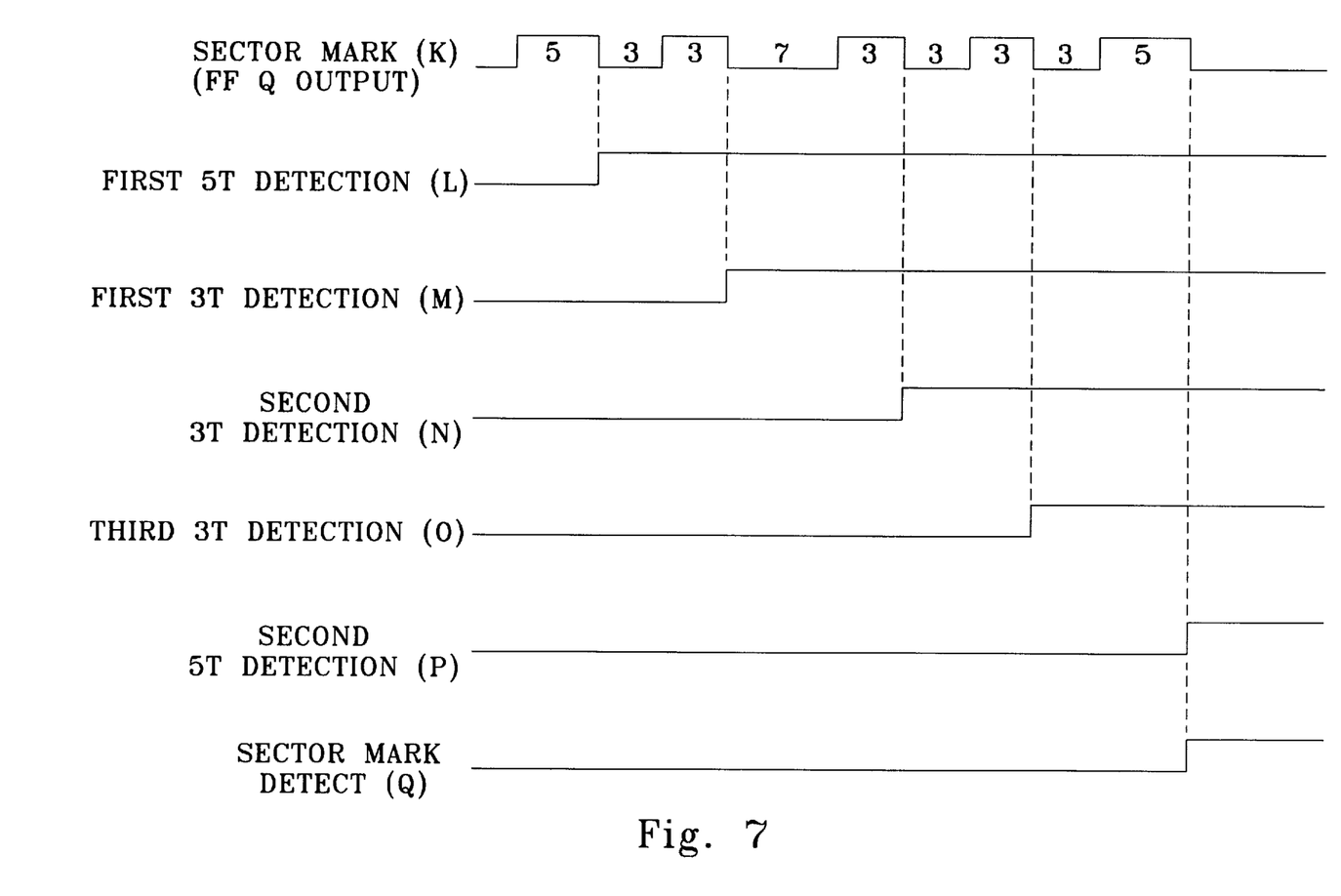
FIG. 7 is a diagram showing a waveform in the sector mark recognizing circuit in FIG. 6.

FIG. 6 is a diagram showing a construction of a sector mark recognizing circuit in FIG. 2. FIG. 7 is a diagram illustrating waveforms in the recognizing circuit in FIG.6.

The sector mark recognizing circuit 32 recognizes a length (time) and a position of the pattern of the sector mark. The sector mark pattern is exemplified by the 53335 pattern mentioned above.

Each of a 5T measuring unit 60, a 3T measuring unit 61, a 3T measuring unit 62, a 3T measuring unit 63 and a 5T measuring unit 64, is constructed of a timer. The 5T measuring unit 60 detects a first 5T pattern of the sector mark. The 3T measuring unit 61 is actuated by a detection signal L of the 5T measuring unit 60, and detects a first 3T pattern of the sector mark.

The 3T measuring unit 62 is actuated by a detection signal M of the 3T measuring unit 61, and detects a second 3T pattern of the sector mark. The 3T measuring unit 63 is actuated by a detection signal N of the 3T measuring unit 62, and detects a third 3T pattern of the sector mark. The 5T measuring unit 64 is actuated by a detection signal O of the 3T measuring unit 63, and detects a second 5T pattern of the sector mark.

An AND gate 65 takes a logic product of the detection signals L, M, N, O, P of the measuring units 60–64, and outputs a sector mark detection signal SMD. Thus, the length (time) and the position of the pattern of the sector mark are recognized.

Figure 8:
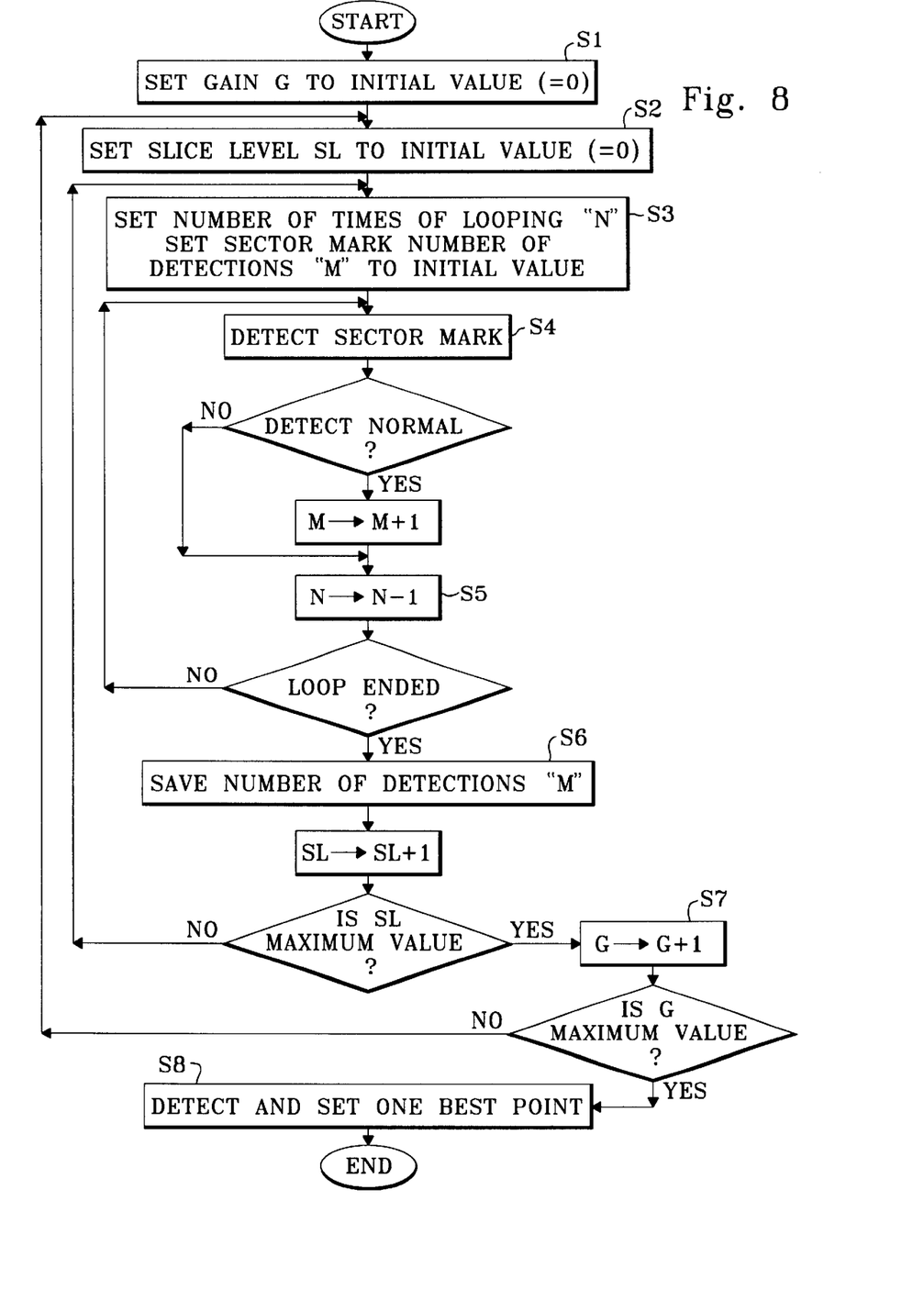
FIG. 8 is a detecting condition adjusting flowchart in one embodiment of the present invention.

FIG. 8 is a detecting condition adjusting flowchart in one embodiment of the present invention.

(S1) The MPU 20 sets the control gain of the register 48 to an initial value (=0).

(S2) The MPU 20 sets the slice level SL of the register 50 to an initial value (=0).

(S3) The MPU 20 sets the number of times of looping to N. Then, the MPU 20 sets to an initial value (=0) a number-of-times M indicating how many times the sector mark is detected.

(S4) The MPU 20 indicates the ODC 24 and the read circuit 26 to detect the sector mark. The MPU 20, after giving the indication to detect it, checks whether or not the detection signal SMD of the sector mark arrives within a predetermined time. The MPU 20, when the detection signal SMD of the sector mark arrives within the predetermined time, judges the detection to be normal, and updates the number-of-times M to (M+1). The MPU 20, when the detection signal SMD of the sector mark does not arrive within the predetermined time, judges the detection to be abnormal, and does not update the number-of-times M to (M+1).

(S5) The MPU 20 updates the number-of-times-of-looping N to (N−1). Then, the MPU 20 judges whether or not the measurements corresponding to a predetermined number of times of looping are finished. If the measurements corresponding to the predetermined number of times of looping are not yet finished, the MPU 20 returns to step S4.

(S6) The MPU 20, when judging that the measurements for the number-of-times of looping are ended, stores the memory 21 with the number-of-detections M. Then, the MPU 20 updates the slice level SL of the register 50 to (SL+1). Then, the MPU 20 checks whether or not the slice level takes a maximum value. If the slice level L is not the maximum value, the MPU 20 goes back to step S3.

(S7) The MPU 20, when judging that the slice level SL reaches the maximum value, updates the control gain (G) of the register 48 to (G+1). Then, the MPU 20 checks whether or not the control gain G takes the maximum value. If the control gain G is not the maximum value, the MPU 20 returns to step S2.

(S8) The MPU 20, when judging that the control gain G reaches the maximum value, detects a best point of the detection condition and sets it in the registers 48, 50. Namely, the memory 21 is stored with the number of detections when setting each slice level in each control gain. The MPU 20 obtains a combination of the slice level and the control gain when the number of detections comes to the maximum. The detection condition with the highest detection probability can be thereby obtained.

Incidentally, the reason why the slice level of the linear differentiation is changed is as follows. A window signal is generated from the linear differentiation. If the linear differentiation signal is improper, the window is not precisely created or occurs at random due to noises. This makes it impossible to precisely form the sector mark.

Figure 9:
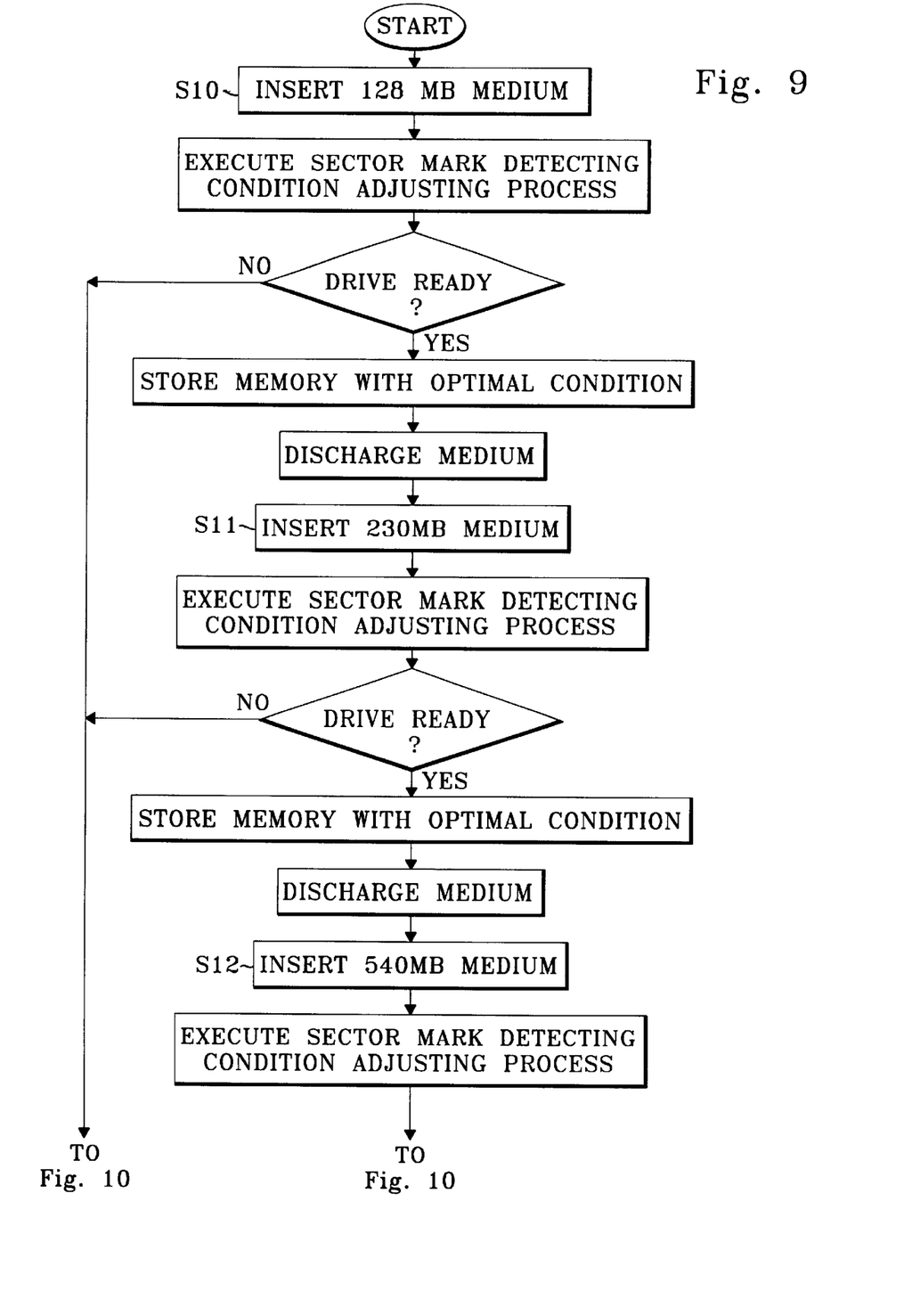
FIG. 9 is a measuring flowchart (part 1) when tested in one embodiment of the present invention.
Figure 10:
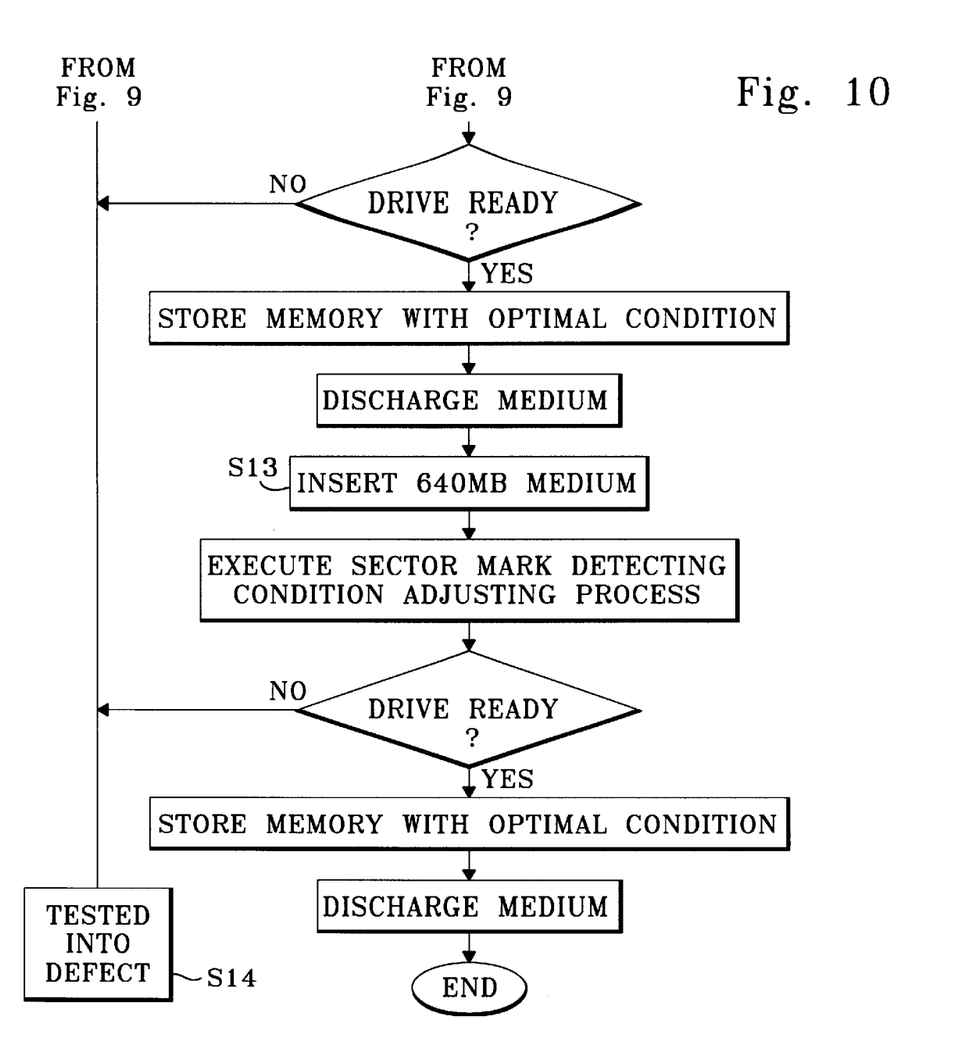
FIG. 10 is a measuring flowchart (part 2) when tested in one embodiment of the present invention.

FIGS. 9 and 10 are measurement flowcharts when testing the device.

This embodiment shows an adjusting process of the sector mark detecting condition of the optical disk device, wherein mediums of 128 MB (Mega Byte), 230 MB, 540 MB and 640 MB can be dealt with.

(S10) When the 128 MB medium (an optical disk) is inserted, the MPU 20 executes the adjusting process of the sector mark detecting condition shown in FIG. 8. Then, the MPU 20 checks whether or not the device is set in a drive-ready status. If not brought into the drive-ready status, as shown in FIG. 10, the MPU 20 proceeds to step S14.

If brought into the drive-ready status, the MPU 20 stores the memory 21 with the adjusted optimal condition. Then, the medium is discharged.

(S11) When the 230 MB medium (the optical disk) is inserted, the MPU 20 executes the adjusting process of the sector mark detecting condition shown in FIG. 8. Then, the MPU 20 checks whether or not the device is set in a drive-ready status. If not brought into the drive-ready status, as shown in FIG. 10, the MPU 20 proceeds to step S14.

If brought into the drive-ready status, the MPU 20 stores the memory 21 with the adjusted optimal condition. Then, the medium is discharged.

(S12) When the 540 MB medium (the optical disk) is inserted, the MPU 20 executes the adjusting process of the sector mark detecting condition shown in FIG. 8. Then, the MPU 20 checks whether or not the device is set in a drive-ready status. If not brought into the drive-ready status, as shown in FIG. 10, the MPU 20 proceeds to step S14.

If brought into the drive-ready status, the MPU 20 stores the memory 21 with the adjusted optimal condition. Then, the medium is discharged.

(S13) When the 640 MB medium (the optical disk) is inserted, the MPU 20 executes the adjusting process of the sector mark detecting condition shown in FIG. 8. Then, the MPU 20 checks whether or not the device is set in a drive-ready status. If not brought into the drive-ready status, as shown in FIG. 10, the MPU 20 proceeds to step S14.

If brought into the drive-ready status, the MPU 20 stores the memory 21 with the adjusted optimal condition. Then, the medium is discharged.

(S14) If not brought into the drive-ready status, the result of the test is considered defective.

As explained above, a variety of mediums are inserted before delivering the device, the condition is adjusted to the optimal condition, and the memory 21 is stored with this adjusted optimal condition. It therefore sets a different optimal condition per medium.

Figure 11:
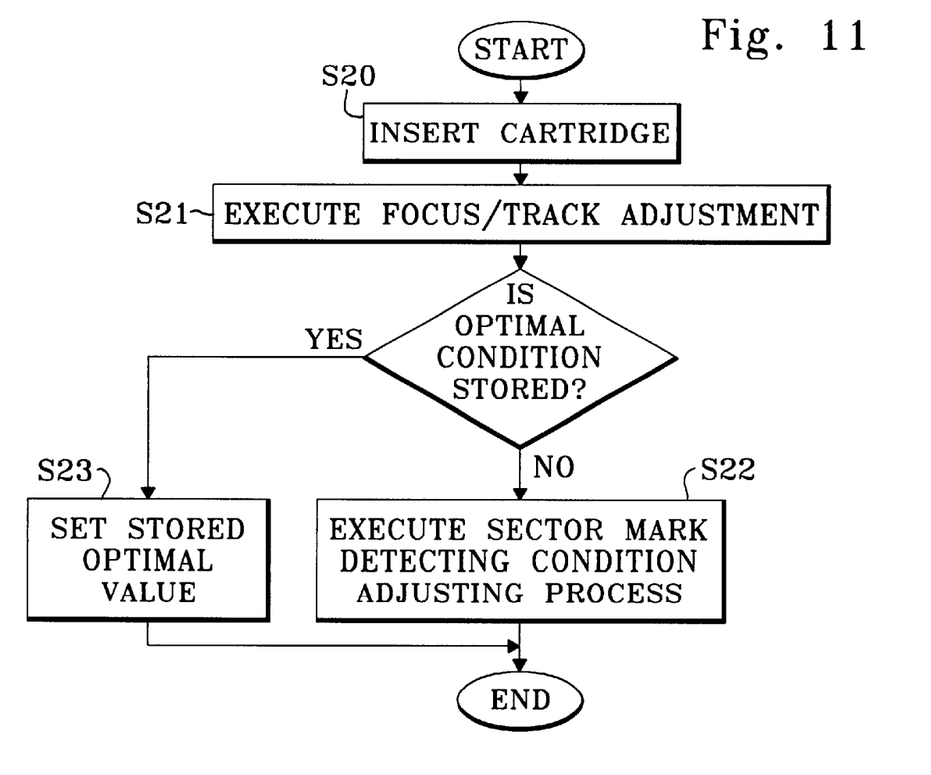
FIG. 11 is an operation flowchart when inserting a cartridge in one embodiment of the present invention.

FIG. 11 is an operation flowchart when inserting a cartridge.

In this embodiment, the adjusting process of the sector mark detecting condition is executed when inserting the cartridge.

(S20) The MPU 20, when the cartridge (an optical disk medium) is inserted, executes a focus control process and a track control process.

(S21) The MPU 20 makes the memory 21 distinguish a storage capacity of the medium thereof. Then, the MPU 20 checks whether or not the memory 21 is stored with the storage capacity optimal condition to the medium.

(S22) The MPU 20, when judging that the memory 21 is not stored with the optimal condition, executes the adjusting process of the optimal condition of the sector mark shown in FIG. 8. Then, the processing comes to an end.

(S23) The MPU 20, reversely when judging that the memory 21 is stored with the optimal condition, sets in the registers 48, 50 the optimal condition saved in the memory 21, and finishes the processing.

Thus, the sector mark detecting condition of the binarizing circuit 30 is set to the optimal value in the adjusting process when inserting the cartridge. If the memory 21 is stored with the optimal value, a content of the memory 21 is set. Whereas if the memory 21 is not stored with the optimal value, the adjusting process is executed, thereby setting it to the optimal value.

Accordingly, even when either the storage capacity or the manufacturer may be different, the optimal value can be set in each of the storage mediums by executing the adjusting process when inserting the cartridge. Further, the adjusting process is done at a variety of timings such as when inserting the cartridge and before a seek process, whereby the optimal value can be set with respect to a performance and environments (temperature, voltage) of the drive itself.

Figure 12:
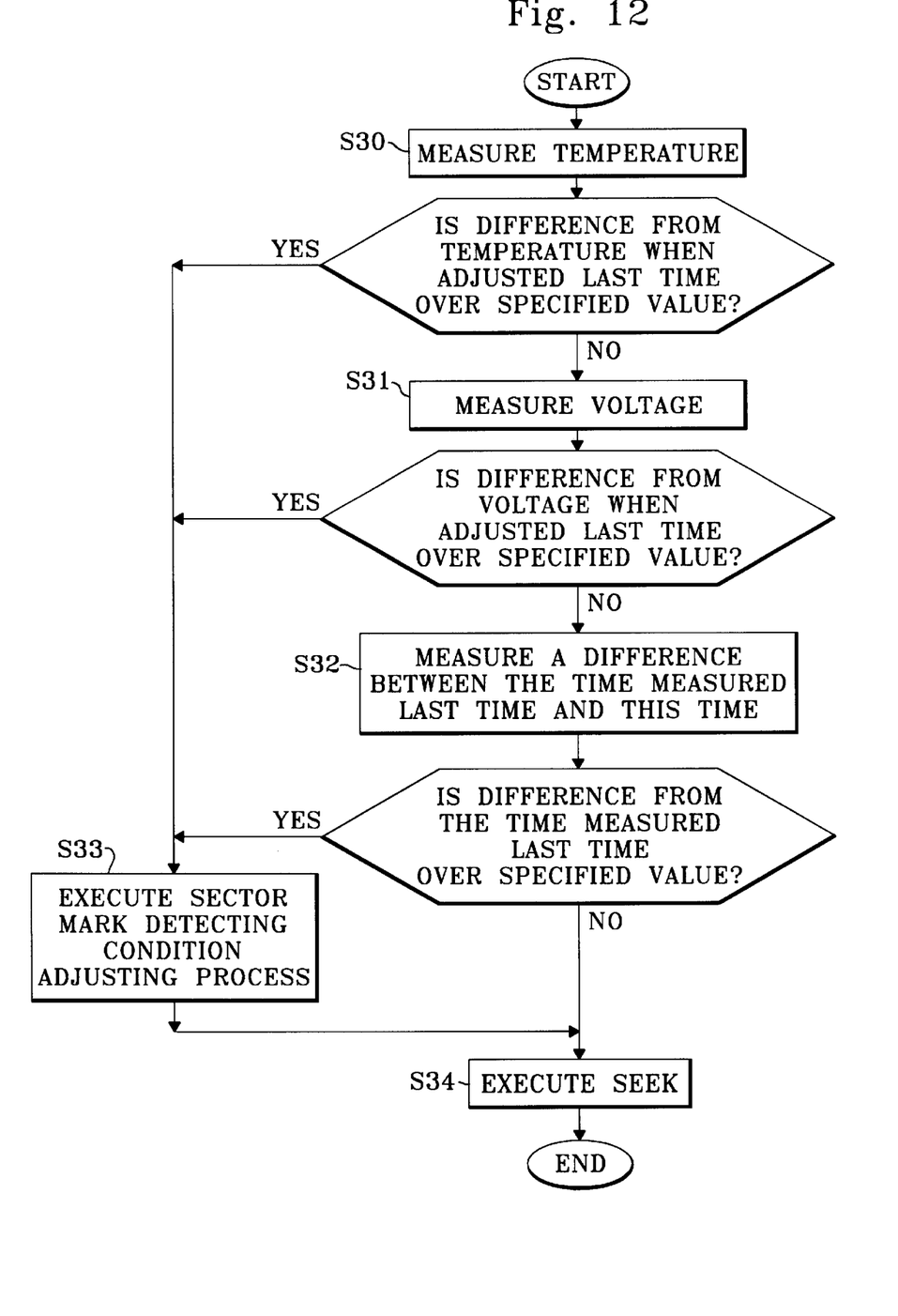
FIG. 12 is an operation flowchart when in a seek process in one embodiment of the present invention.

FIG. 12 is an operation flowchart when in a seek process.

In this example, before executing the seek process, the adjusting process of the sector mark detecting condition is executed.

(S30) The MPU 20 detects a temperature of the device through a temperature sensor before executing the seek process. The temperature sensor is incorporated into the optical head 13. Then, the memory 21 is stored with a measured temperature when adjusted last time. The MPU 20 calculates a difference between the temperature measured last time and a temperature measured this time. Then, the MPU 20 judges whether this difference is over a specified value or not. If the difference is over the specified value, this indicates that a variation in temperature is large. Accordingly, there is a possibility in which the detecting condition of the optical head might have changed. Hence, the MPU 20 proceeds to step S33.

(S31) The MPU 20, if the temperature difference is not over the specified value, detects a voltage of the power supply of the device. The memory 21 is stored with the voltage measured when adjusted last time. The MPU 20 calculates a difference between the voltage measured last time and a voltage measured this time. Then, the MPU 20 judges whether this difference is over the specified value or not. If the difference is over the specified value, this indicates that a variation in temperature occurs. Accordingly, there is a possibility in which the detecting condition of the optical head might have changed. Hence, the MPU 20 proceeds to step S33.

(S32) The memory 21 is stored with a time when adjusted last time. The MPU 20, if a voltage difference is not over a specified value, calculates a difference between the time measured last time and a time measured this time. Then, the MPU 20 judges whether this difference is over the specified value or not. If the difference is over the specified value, there is a possibility in which the detecting condition of the optical head might have changed. Hence, the MPU 20 proceeds to step S33.

(S33) The MPU 20 executes the adjusting process of the detecting condition of the sector mark shown in FIG. 8.

(S34) Then, the MPU 20 executes the seek process.

As described above, there is a possibility wherein a reading condition of the optical head may change with the temperature and the voltage change, and when a long time has elapsed since the adjusting time of the last time. In such a case, there exists a possibility in which the optimal condition of the sector mark may vary. Then, before executing the seek process, the detecting condition of the sector mark is adjusted. A decline of the detecting rate of the sector mark can be thereby prevented beforehand.

Figure 13:
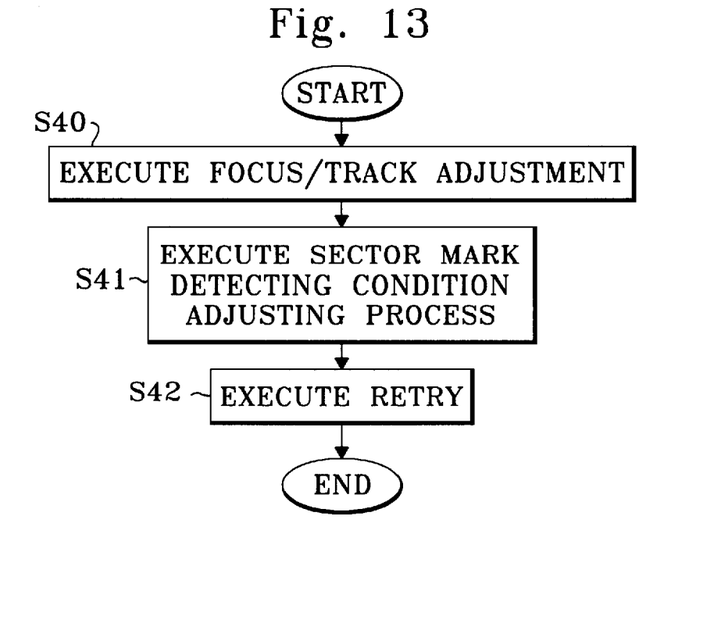
FIG. 13 is an operation flowchart when in a seek retry process in one embodiment of the present invention.

FIG. 13 is an operation flowchart when in a seek retry process.

In accordance with this embodiment, the adjusting process of the sector mark detecting condition is carried out before the seek retry process after failing to seek.

(S40) The MPU 20 makes the focus adjustment and the track adjustment.

(S41) The MPU 20 executes the adjusting process of the optimal condition of the sector mark shown in FIG. 8.

(S42) Then, the MPU 20 starts retrying the seek.

As described above, when failing to seek, there exists the possibility in which the optimal condition of the sector mark might have changed. Then, before executing the retrying process of the seek, the sector mark detecting condition is adjusted. With this adjustment, it is feasible to prevent beforehand the seek retry process from becoming unsuccessful.

The present invention may be modified in addition to the embodiments discussed above.

(1) The optical storage medium is, though touched upon with respect to the optical disk, applicable to other optical storage mediums such as an optical card, etc.

(2) The binarizing circuit has been exemplified by showing the construction in FIG. 3, however, may take other constructions.

(3) The gain and the slice level have been given by way of detection parameters of the binarizing circuit, however, the gain or the slice level may also a be set variable. Further, other parameters for binarization may also be changed.

(4) The adjustment of the detecting condition has been explained by giving the example of being adjusted when testing the device, when inserting the cartridge, when in seek process and when in the seek retry process, respectively. The adjustment may, however, be made in any one of such cases or in a combination of a plurality of such cases.

(5) The device has been described by way of the one treating the four types of mediums having different storage capacities. The present invention is, however, applicable to a device dealing with the single type of medium and to a device dealing with two or more types of mediums.

(6) In the device treating the two or more types of mediums, the detecting condition is set corresponding to each medium, however, the same detecting condition may also be set.

The present invention has been discussed so far by way of the embodiments but may be modified in a variety of forms within the scope of the gist of the present invention, and these modifications are not excluded from the range of the present invention.

As described above, the present invention exhibits effects which follow.

(1) The optimal sector mark detecting condition to each individual optical storage device, is automatically measured, and the detection parameter of the binarizing circuit is adjusted to the optimal value. Therefore, even when the storage capacity of the optical storage medium increases, the detection rate of the sector mark can be enhanced.

(2) Even in such a case that the variety of optical storage mediums are dealt with, the sector mark detection rate can be enhanced. Accordingly, it is feasible to prevent a decline of the access time to the optical storage device.

What is claimed is:

1. An optical storage device for reading information from an optical storage medium by use of an optical head, said optical storage medium having a sector mark formed as an emboss for recognizing a start of a sector, said optical storage device having a sector mark detecting unit including:
   a binarizing circuit, for binarizing a reading signal of said optical head in accordance with a predetermined detection parameter, said detection parameter being variable;
   a recognizing unit for recognizing said sector mark from an output of said binarizing unit; and
   a control unit for measuring an output of said recognition unit to determine an optimal value of the detection parameter of said binarizing unit for obtaining a preferable sector mark detection probability, and controlling said detection parameter of said binarizing unit to said optimal value according to said determination.

2. An optical storage device according to claim 1, wherein said control unit measures said sector mark detection probability of said recognizing unit while changing said detection parameter of said binarizing unit, and thus determines said optimal value.

3. An optical storage device according to claim 1, further comprising:
   a memory for storing said optimal value for each of plural types of optical storage mediums,
   wherein said control unit controls the detection parameter of said binarizing unit to said optimal value in said memory in accordance with the type of said optical storage medium to be set.

4. An optical storage device according to claim 3, wherein said memory is stored with said optimal value for each of said optical storage mediums having different storage capacities.

5. An optical storage device according to claim 1, wherein said control unit measures said optimal value of said detection parameter of said binarizing unit when inserting said optical storage medium.

6. An optical device according to claim 1, wherein said control unit measures said optimal value of said detection parameter of said binarizing unit when said optical head retries to seek the optical storage medium.

7. An optical storage device according to claim 1, wherein said control unit detects a temperature of said optical storage device and, when a difference between said detected temperature and a temperature detected last time is over a predetermined value, measures the optimal value of said detection parameter of said binarizing unit.

8. An optical storage device according to claim 1, wherein said control unit detects an operation voltage applied to said optical storage device from an external source and, when a difference between said detected operation voltage and an operation voltage detected last time is over a predetermined value, measures the optimal value of said detection parameter of said binarizing unit.

9. An optical storage device according to claim 1, wherein said control unit, when a predetermined time has elapsed since the adjustment of the last time, measures said optimal value of said detection parameter of said binarizing unit.

10. An optical storage device according to claim 1, wherein said control unit, before delivering said optical storage, measures said optimal value of said detection parameter of said binarizing unit.

11. An optical storage device according to claim 1, wherein said binarizing unit includes:
    a gain control unit for imparting a gain to said reading signal; and
    a comparator for comparing an output of said gain control unit with a predetermined slice level, and
    wherein said control unit controls said gain of said gain control unit to an optimal value.

12. An optical storage device according to claim 1, wherein said binarizing unit includes:
    a gain control unit for imparting a gain to said reading signal; and
    a comparator for comparing an output of said gain control unit with a predetermined slice level, and
    wherein said control unit controls said slice level of said comparator to an optimal value.

13. An optical storage device according to claim 12, wherein said control unit controls, to optimal values, the gain of said gain control unit and said slice level of said comparator.

14. An optical storage device according to claim 1, wherein the optical storage medium is an optical disk.

* * * * *